United States Patent Office 3,457,266
Patented July 22, 1969

3,457,266
1,2 DIHYDRO 4-ISOQUINOLONES IS PROVIDED
John Thaddeus Gibas, Hillside, Hsi Lin Lee, Nutley, and Wilhelm Wenner, Upper Montclair, N.J., assignors to Hoffmann-La Roche Inc., Nutley, N.J., a corporation of New Jersey
No Drawing. Continuation-in-part of application Ser. No. 357,318, Apr. 3, 1964. This application Mar. 24, 1966, Ser. No. 537,018
Int. Cl. C07d *35/14;* C07c *101/18*
U.S. Cl. 260—289     7 Claims

ABSTRACT OF THE DISCLOSURE 1,2 dihydro 4 isoquinolones obtained from benzylamino acids are disclosed. The compounds are useful as short acting vaso depressors and as intermediates for 1,4 benzo diazepin-2(1H)-ones useful as anti convulsants, muscle relaxants and sedatives.

---

This is a continuation-in-part of co-pending application Ser. No. 357,318, filed Apr. 3, 1964 and now abandoned.

The present invention relates to novel processes for preparing organic compounds, certain of which are novel, and to novel intermediates useful in such a preparative technique.

The novel process aspect of the present invention relates to a method for preparing 4-isoquinolones. The novel intermediates useful in theis preparative technique are novel benzylamino acids and esters of a type identified more completely hereinafter. Other novel intermediates useful in the preparation of 4-isoquinolones are benzylamines of a class more specifically hereinafter identified. The novel process aspect of the present invention involves preparing benzylamino acids and esters thereof from benzylamines and the subequent conversion of the last mentioned benzylamino acids and esters thereof to 4-isoquinolones.

More particularly, the novel process aspect of the present invention provides a facile route to 4-isoquinolones of the formula

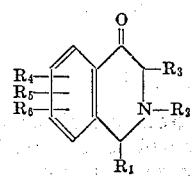

wherein $R_1$ is selected from the group consisting of hydrogen, lower alkyl, phenyl and halophenyl; $R_2$ is selected from the group consisting of hydrogen, lower alkyl, benzyl and substituted benzyl; $R_3$ is selected from the group consisting of hydrogen and lower alkyl and $R_4$, $R_5$ and $R_6$ are each selective from the group consisting of hydrogen, lower alkyl and lower alkoxy.

Compounds of the Formula I wherein at least one of $R_1$, $R_3$, $R_4$, $R_5$ and $R_6$ is other than hydrogen constitute a novel class of compounds and are included within the purview of the present invention. Especially preferred for the purposes of the present invention are the novel compounds of the Formula I above wherein at least one of $R_4$, $R_5$ and $R_6$ is the substituent which is not hydrogen, most preferably, where at least one of these groupings is lower alkoxy. Also preferred are compounds wherein when $R_4$, $R_5$ and $R_6$ are all hydrogen, $R_2$ is other than hydrogen and lower alkyl.

The term "halogen," as used throughout the instant disclosure and claims, is intended to connote chlorine, bromine, fluorine and iodine, unless otherwise specified. The expression "lower alkyl," as utilized throughout the instant specification and claims, is intended to connote both straight and branched chain lower alkyl groups such as methyl, ethyl, propyl, isopropyl, butyl and the like. The expression "substituted benzyl" is intended to designate a benzyl group substituted in the α-position with a lower alkyl group or a benzyl group substituted in the phenyl nucleus with a substituent such as lower alkyl, e.g. methyl, halo, e.g. chlorine, and the like. The term "lower alkoxy" as utilized herein represents both branched and straight chain lower alkyl-oxy groups such as methoxy, ethoxy, propyloxy, isobutyloxy and the like.

Also included within the purview of the present invention are the pharmaceutically acceptable acid addition salts of compounds having the Formula I above. Compounds of formula I above form pharmaceutically acceptable acid addition salts with pharmaceutically acceptable acids, for example, with inorganic and organic acids such as hydrochloric acid, hydrobromic acid, sulfuricacid, phosphoric acid, citric acid, nitric acid, tartaric acid, salicylic acid, toluene-sulfonic acid, ascorbic acid, maleic acid, succinic acid, formic acid, acetic acid and the like.

Compounds of formula I above are prepared by treating benzylamino acids and esters thereof of the formula

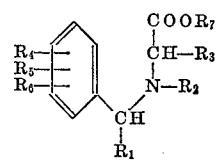

wherein $R_1$, $R_2$, $R_3$, $R_4$, $R_5$ and $R_6$ are as above and $R_7$ is selected from the group consisting of hydrogen and lower alkyl with a dehydrating agent, preferably, but not exclusively, in the presence of an aqueous medium. Also preferred are compounds wherein when $R_4$, $R_5$ and $R_6$ are all hydrogen, $R_2$ is other than hydrogen and lower alkyl.

Dehydrating agents suitable for use in the preparation of compounds of Formula I above from compounds of Formula II above, according to the present invention, may be represented by proton-donating inorganic acids such as hydrochloric acid, hydrobromic acid, sulfuric acid, phosphoric acid and the like. Sulfuric acid is preferred.

While the dehydrating agent may be provided to the reaction medium disposed in any solvent which would function efficaciously for the purpose of the present invention, in a preferred aspect it is disposed in an aqueous medium. Advantageously, it is present in the aqueous medium in from about 50 to about 95 percent concentration. Still more advantageously, it is present in the aqueous medium in from about 70 to about 90 percent strength. While temperature and pressure can vary within wide limits, it is preferred to effect the conversion of compounds of Formula II above to compounds of Formula I above at a temperature of from about room temperature to about 100° C., more preferably from about 70° C. to about 100° C. Compounds of the Formula II above wherein at least one of $R_1$, $R_3$, $R_4$, $R_5$ and $R_6$ is other than hydrogen are novel and are useful as intermediates in the preparation of compounds of Formula I above. Thus, they constitute a part of the present invention. Especially preferred for the purposes of the herein disclosed novel preparative technique are compounds of the Formula II above wherein at least one of $R_4$, $R_5$ and $R_6$ is lower alkoxy.

Compounds of Formula III above can be prepared by reacting a benzylamine of the formula

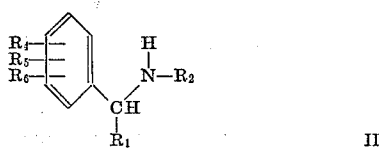

III wherein $R_1$, $R_2$, $R_4$, $R_5$ and $R_6$ are as in Formula I above with a compound of the formula

IV wherein $R_3$ and $R_7$ are as above and X is selected from the group consisting of chlorine, bromine and iodine.

Intermediates of Formula III above wherein at least one of $R_1$ and $R_2$ is phenyl, halophenyl, benzyl and substituted benzyl, i.e. at least one of $R_1$ and $R_2$ is other than hydrogen and lower alkyl, are novel and, thus, constitute a part of the present invention.

The conversion of compounds of Formula III above to the corresponding compounds of Formula II above proceeds preferably in the presence of any suitable inert organic solvent which may be benzene, toluene, tetrahydrofuran, ether and the like. While temperature and pressure may vary within wide limits, it has been found preferable to operate at elevated temperatures. In a preferred aspect, the temperature of the reaction medium during this process step is maintained at about the reflux temperature of the solvent. Representative of compounds of the Formula IV above, suitable for the purposes of the present invention, are ethyl α-chloropropionate and ethyl chloroacetate.

Compounds of Formula III above are prepared from the corresponding compounds of the formula

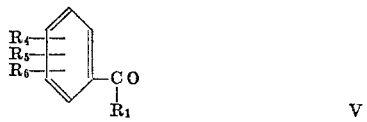

V wherein $R_1$, $R_4$, $R_5$ and $R_6$ are as in Formula I above by treating the latter compounds with a nitrogen-containing compounds of the formula $$R_2NH_2$$

wherein $R_2$ is as in Formula I above.

The conversion of compounds of Formula V above to the corresponding compounds of Formula III above proceeds through two interrelated steps. The first step involves the formation of an imine having the formula

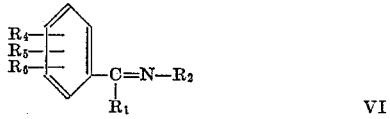

VI wherein $R_1$, $R_2$, $R_4$, $R_5$ and $R_6$ are as in Formula I above

The imine of Formula VI above is then reduced in the presence of any suitable reducing system capable of effecting such reduction.

The reduction of the —C=N— group of the imine of Formula VI above may be achieved by catalytic hydrogenation or by treating a compound of the Formula VI above with a borohydride or any suitable reducing agent capable of reducing the double bond. The preferred reagents are alkali metal borohydrides, e.g. lithium borohydride, potassium borohydride, or, most preferably, sodium borohydride. Other borohydrides such as alkaline earth metal borohydrides, e.g. calcium borohydride or aluminum borohydride may be used as well. Preferably, an organic solvent such as an ether, e.g. diethyl ether, a lower alkanol, e.g. methanol, ethanol and propanol, tetrahydrofuran and the like is employed as the reaction medium. The reduction is carried out at room temperature or at an elevated temperature, if necessary, in the atmosphere of an inert gas such as nitrogen.

The conversion of the compound of Formula V above to the compound of Formula III above can, of course, be conducted either with or without isolation of the intermediate compound of Formula VI above. Thus, a compound of Formula V above can be treated with ammonia or a primary amine, i.e. a compound of the formula $R_2NH_2$ wherein $R_2$ is as in Formula I above, preferably, a primary lower alkyl amine or benzyl amine whereby a compound of the Formula VI above is obtained and the so-formed imine can be reduced in the manner set out above. On the other hand, a compound of Formula III above can be prepared by a single step involving the reaction of a compound of Formula V above with a compound of the formula $R_2NH_2$ wherein $R_2$ is as in Formula I above under reducing conditions, preferably in the presence of a suitable solvent, until a compound of Formula III above is obtained without interrupting the reaction or isolating an intermediate of Formula VI above.

Compounds of Formula I above can be converted to pharmaceutically desirable 1,4-benzodiazepin-2(1H)-ones in the manner set out in application Ser. No. 357,295, filed on Apr. 3, 1964, in the names of Rodney Ian Fryer and Leo Henryk Sternbach and now abandoned. Application Ser. No. 357,295, therefore, teaches reacting a compound of the formula

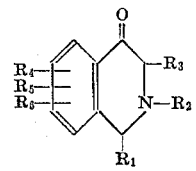

I wherein $R_1$, $R_2$, $R_3$, $R_4$, $R_5$ and $R_6$ have the same meaning as ascribed thereto hereinabove with hydroxylamine whereby to form a compound having the formula of

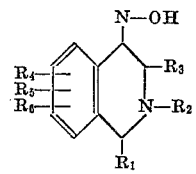

IIA wherein $R_1$, $R_2$, $R_3$, $R_4$, $R_5$ and $R_6$ are as above and the subsequent treatment of the so-formed oxime of Formula IIA above with a substantially anhydrous acid agent, e.g. a strong mineral acid (polyphosphoric acid or concentrated sulfuric acid), phosphorus trichloride in ether, acid chlorides (thionyl chloride, phenyl sulfonyl chloride, picryl chloride), acetic anhydride and the like whereby ring enlargement to a benzodiazepine of the formula

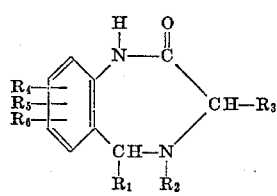

IIIA occurs.

The first phase of the reaction, i.e. the conversion of a compound of the Formula I above to the corresponding compound of Formula IIA above is preferably effected in the presence of an inert organic solvent which may be a lower alkanol such as methanol or ethanol, ethers, such as ethyl ether, tetrahydrofuran, pyridine and the like. The reaction may be effected at room temperature and atmospheric pressure or at elevated temperatures and/or elevated pressures. While, as is evident from the above, temperature and pressure are not critical, it is preferred to operate in a temperature range of from about 60° C. to about 120° C.

The second phase of the reaction, i.e. the conversion of compounds of Formula IIA above to compounds of Formula IIIA above, may be effected employing the said acid agent in excess and thus, it can function as the reaction media. In the alternative, a conventional inert organic solvent such as benzene and the like can be used as the reaction media. The second phase of the reaction is advantageously effected at elevated temperatures, e.g. in the range of from about 100° C. to about 140° C.

Compounds of Formula I above wherein $R_2$ is a benzyl group or a substituted benzyl group can be debenzylated by conventional debenzylating techniques, e.g. hydrogenation preferably in the presence of a conventional hydrogenation catalyst such as platinum and the like prior to treatment with hydroxylamine whereby to form the corresponding compound wherein $R_2$ is hydrogen. The resultant compound i.e., a compound of Formula I above wherein $R_2$ is hydrogen, can then be reacted with hydroxylamine to form the corresponding oxime of Formula IIA above. The last-mentioned oxime can be ring enlarged to the corresponding benzodiazepine in the manner set out above. On the other hand, a compound corresponding to Formula I above wherein $R_2$ is benzyl or substituted benzyl can be first reacted with hydroxylamine to form the corresponding compound of Formula IIA above and the resultant compound can be treated in the manner set out above whereby to effect ring enlargement to the benzodiazepine corresponding to Formula IIIA above wherein $R_2$ is benzyl or a substituted benzyl group. The so-formed compound can then be debenzylated, if desired, to the corresponding compound of Formula IIIA above wherein $R_2$ is hydrogen. Compounds corresponding to Formula IIIA above wherein at least one of $R_4$, $R_5$ and $R_6$ is lower alkyloxy, and $R_2$ is other than hydrogen, are novel. Such compounds are useful as anticonvulsants, muscle relaxants and sedatives.

Such novel benzodiazepines have the formula

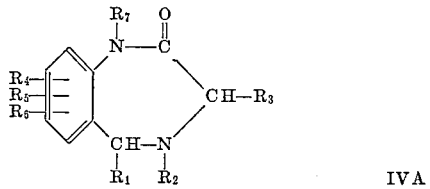

IVA wherein $R_1$ is selected from the group consisting of hydrogen, lower alkyl, phenyl and halo phenyl; $R_2$ is selected from the group consisting of lower alkyl, benzyl and substituted benzyl; $R_3$ is selected from the group consisting of hydrogen and lower alkyl; $R_4$, $R_5$ and $R_6$ are selected from the group consisting of lower alkoxy, lower alkyl and hydrogen and $R_7$ is selected from the group consisting of hydrogen and lower alkyl at least one of $R_4$, $R_5$ or $R_6$ being lower alkoxy.

Compounds of Formula IVA above can be administered internally, for example, parenterally or enterally in conventional pharmaceutical dosage forms. For example, they can be employed in conventional liquid or solid vehicles to provide elixirs, suspensions, tablets, capsules, powders and the like according to acceptable pharmaceutical practices.

In application Ser. No. 357,295, the following examples are found:

Compound 1

A mixture of 1.0 g. of 1,2-dihydro-7-methoxy-2-methyl-1-phenyl-4(3H)-isoquinolone, 1.0 g. of hydroxylamine hydrochloride, 2.0 g. of hydrated sodium acetate 10 ml. of water and 20 ml. of ethanol were heated under reflux for ½ hour. A precipitate formed upon cooling the mixture and the resultant precipitate was separated by filtration. The precipitate was recrystallized from a mixture of dioxane and water (1/1 v./v.) to give 1,2-dihydro-7-methoxy - 2 - methyl - 1 - phenyl - 4(3H) - isoquinolone oxime, M.P. 211–214°.

Compound 2

A mixture of 500 mg. of 1,2-dihydro-7-methoxy-2-methyl-1-phenyl-4(3H)-isoquinolone oxime and 10 g. of polyphosphoric acid was carefully heated to 130° and maintained approximately at this temperature for 10 mnutes. The recation mixture was treated with 300 g. of ice and made basic with ammonium hydroxide. A precipitate which formed was removed by filtration. The precipitate was dissolved in dioxane and filtered through 5 g. of neutral activated alumina. The solvent was removed under reduced pressure. The residual oil was dissolved in 50 ml. of dichloromethane and the resultant solution was then extracted with 3 N hydrochloric acid (3×25 ml.). The acid extracts were combined, made basic with ammonium hydroxide and extracted with dichloromethane (3×20 ml.). The dichloromethane extracts were combined, washed with water (2×10 ml.), dried with anhydrous sodium sulfate, filtered and evaporated. The residue was recrystallized from dichloromethane to give 7-methoxy - 4 - methyl-5 - phenyl-1,3,4,5-tetrahydro-2H-1,4-benzodiazepin-2-one, M.P. 214–215°.

Compound 3

A mixture of 10.0 g. of 2-benzyl-1,2-dihydro-7-methoxy-4(3H)-isoquinolone, 10.0 g. of hydroxylamine hydrochloride, 20.0 g. of sodium acetate hydrate 100 ml. of water and 200 ml. of ethanol were heated under reflux for ½ hour. A precipitate formed upon cooling the mixture. The precipitate was filtered off to give 2-benzyl-1,2-dihydro-7 - methoxy-4(3H)-isoquinolone oxime, M.P. 189–192°. Upon recrystallization from the aqueous dioxane solution, it was found to have a melting point of 192–194°.

The compounds of Formula I above and the non-toxic salts with pharmaceutically acceptable acids are further useful as short-acting vasodepressors. They can be administered internally, for example, parenterally or enterally with dosage adjusted to individual requirements. They can be combined in conventional pharmaceutical dosage forms, for example, both solid and liquid dosage forms such as suspensions, solutions, tablets, capsules or the like.

The following examples are illustrative but not limitative of the present invention. All temperatures are stated in degrees centigrade.

Example 1

136 g. of 3-methoxybenzaldehyde was mixed with 900 ml. of an ice cold 20 percent solution of ammonia in methanol. At 80–90° and 100 lbs. pressure, the solution was hydrogenated over Raney nickel. The solvent was distilled off and the residue was fractionated in vacuo yielding 3-methoxybenzylamine of B.P. 115–120° at 10–12 mm.

A sample was converted into the hydrochloride which melts at 166–167°.

Example 2

A mixture of 14 g. of 3-methoxybenzylamine, 13 g. of ethyl chloroacetate, 15 g. of anhydrous sodium carbonate and 100 ml. of benzene was refluxed overnight. After cooling, the salts were filtered off and the filtrate was evaporated to dryness. The residue was covered with ether. The resultant mixture was allowed to stand for one hour and was then evaporated to give the N-(3-methoxybenzyl)glycine ethyl ester as an oil. The ester was dissolved in ether and treated with isopropanolic hydrochloric acid. N-(3-methoxybenzyl)glycine ethyl ester hydrochloride formed which was separated by filtration.

After recrystallization from acetone, the hydrochloride was found to have a melting point of 145–146°.

Example 3

6 g. of N-(3-methoxybenzyl)glycine ethyl ester hydrochloride was dissolved in 30 ml. of 3 N hydrochloric acid. After refluxing overnight, the solvent was distilled off in vacuo. The residue solidified. Recrystallization from ethanol yielded N-(3-methoxybenzyl)glycine hydrochloride, M.P. 211–212°.

Example 4

4 g. of N-(3-methoxybenzyl)glycine ethyl ester hydrochloride was dissolved cold in 30 ml. of 80 percent (by weight) sulfuric acid and the solution heated for four hours on the steambath. The solution was cautiously neutralized with 6 N sodium hydroxide with ice cooling. The turbid solution was extracted repeatedly with ether. The ether extracts were combined and the ether was distilled off leaving 1,2-dihydro-7-methoxy-4(3H)-isoquinolone as an oil. The oil was dissolved in ether and dried. The dried ether solution was neutralized with isopropanolic hydrohydrochloride separated which upon filtration and recrystallization from acetonitrile-methanol gave colorless needles of M.P. 215–216°.

Example 5

27 g. of 3-methoxybenzaldehyde and 16 g. of methylamine in 150 ml. of ethanol were placed into a pressure bottle. Under 50 lbs. of hydrogen pressure, the mixture was warmed for 3 hours to 70–80°. The cooled solution was stirred and 7.5 g. of sodium borohydride was added carefully at room temperature with stirring. After complete addition, stirring was continued for 5 hours. The solvent was distilled off in vacuo and the residue was warmed with 100 ml. of water. The undissolved oil was extracted repeatedly with ether. The dried and filtered ether solution was neutralized with a solution of hydrochloric acid in isopropanol. N-methyl-3-methoxybenzylamine hydrochloride crystallized immediately. Upon recrystallization from isopropanol, it melted at 124–125°.

The hydrochloride was treated with an excess of 6 N sodium hydroxide and the resultant solution was repeatedly extracted with ether. The ether extracts were dried and concentrated in vacuo yielding the free base, N-methyl-3-methoxybenzylamine, as an oil.

Example 6

A mixture of 20 g. of N-methyl-3-methoxybenzylamine, 18 g. of ethyl chloroacetate, 25 g. of anhydrous sodium carbonate and 100 ml. of benzene was refluxed overnight. After cooling, the salts were filtered off and the filtrate was distilled to dryness in vacuo yielding N-(3-methoxybenzyl)-N-methylglycine ethyl ester. The residue was dissolved in ether and the solution filtered after one hour. The solution was then neutralized with isopropanolic hydrochloric acid. N - (3-methoxy-benzyl-N-methylglycine ethyl ester hydrochloride separated and was removed by filtration. After recrystallization from acetone, it was found to have a melting point of 94–96°.

Example 7

A mixture of 12 g. of N-methyl-3-methoxybenzylamine, 16 g. of ethyl α-bromopropionate, 12 g. of anhydrous sodium carbonate and 60 ml. of benzene was refluxed for two days. After cooling, the solution was filtered from the undissolved salts. The filtrate was distilled to dryness in vacuo yielding N-(3-methoxybenzyl)-N-methylalanine ethyl ester. The residue was dissolved in ether and the resultant solution filtered. The filtered ether solution was neutralized with isopropanolic hydrochloric acid yielding N-(3-methoxybenzyl)-N-methylalanine ethyl ester hydrochloride as colorless needles. After recrystallization from benzene-ether, the product was found to have a melting point of 106–107°.

Example 8

5 g. of N-(3-methoxybenzyl)-N-methylglycine ethyl ester hydrochloride and 35 ml. of 80 percent (by weight) sulfuric acid were mixed at 0–5° and the solution warmed for 4 hours on the steambath. The solution was neutralized at 0–10° with 6 N sodium hydroxide solution and was then repeatedly extracted with ether. The ether extracts were dried, combined, and the ether distilled off yielding 1,2-dihydro-7-methoxy-2-methyl-4(3H)-isoquinolone as an oil. The oil was dissolved in ether and the resultant ether solution neutralized with isopropanolic hydrochloric acid. Crystallization from methanol yielded 1,2-dihydro-7-methoxy-2-methyl - 4(3H)-isoquinolone hydrochloride of melting point 242–243°.

Example 9

9 g. of N-(3-methoxybenzyl)-N-methylalanine ethyl ester hydrochloride was dissolved cautiously in 60 ml. of 80 percent (by weight) sulfuric acid. The solution was warmed on the steambath for 4 hours. After cooling, the mixture was cautiously made alkaline with sodium hydroxide solution. The alkaline mixture was extracted repeatedly with ether. The ether extracts were combined and the solvent was distilled off in vacuo yielding 1,2-dihydro-7-methoxy-2,3-dimethyl-4(3H)isoquinolone as an oil. The base was dissolved in ether and the resultant ether solution was neutralized with isopropanolic hydrochloric acid. 1,2-dihydro-7-methoxy-2,3-dimethyl - 4(3H)isoquinolone hydrochloride crystallized and upon recrystallization from isopropanol was found to have a melting point of 195–197°.

Example 10

25 g. of 3-methoxyacetophenone and 16 g. of methylamine in 150 ml. of ethanol were heated to 70–80° under 50 lbs. of hydrogen in a pressure bottle. The cooled solution was stirred and at room temperature 7 g. of sodium borohydride was added in small portions. Addition was complete after approximately 3 hours. The solvent was distilled off in vacuo. The residue was warmed with 200 ml. of water. After cooling, the mixture was extracted repeatedly with ether. The ether solution was dried over potassium carbonate and the ether was removed by distillation in vacuo yielding 2-methoxy-α,N-dimethylbenzylamine as an oil. The base was dissolved in ether and the resultant solution filtered. The filtered solution was neutralized with hydrochloric acid in isopropanol. A colorless hydrochloride separated. It was recrystallized from acetonitrile, yielding 3-methoxy-α,N-dimethylbenzylamine hydrochloride having a melting point of 153–155°. The free base was prepared from the hydrochloride as in Example 5.

Example 11

A mixture of 21 g. of 3-methoxy-α,N-dimethylbenzylamine, 20 g. of ethyl chloroacetate, 25 g. of anhydrous sodium carbonate and 80 ml. of benzene was refluxed overnight. After cooling to room temperature, the undissolved material was filtered off and the filtrate was evaporated to dryness in vacuo yielding N-(3-methoxy-α-methylbenzyl)-N-methylglycine ethyl ester. The base was dissolved in 200 ml. of ether. After filtration, the filtrate was neutralized with isopropanolic hydrochloric acid to yield N-(3-methoxy-α-methylbenzyl) - N - methylglycine ethyl ester hydrochloride. After recrystallization from benzene, the salt was found to have a melting point of 133–134°.

Example 12

10 g. of N-(3-methoxy-α-methylbenzyl)-N-methylglycine ethyl ester hydrochloride was dissolved in 70 ml. of 80 percent (by weight) sulfuric acid and warmed on the steambath for 5 hours. To the cooled solution, 20 percent sodium hydroxide solution was carefully added with stirring, keeping the temperature at 0–10°. The mixture was extracted three times with 50 ml. of ether. The extracts were combined and dried. The ether was removed by distillation in vacuo yielding 2,3-dihydro-7-methoxy-1,2-dimethyl-4(1H)-isoquinolone. The base was dissolved in ether and the resultant ether solution neutralized with isopropanolic hydrochloric acid. 2,3-dihydro-7-methoxy-1,2-dimethyl-4-(1H)-isoquinolone hydrochloride precipitated and, after filtration and recrystallization from methanol-isopropanol, was found to have a melting point of 236–237°.

Example 13

15 g. of N-(3-methoxy-$\alpha$-methylbenzyl)-N-methylglycine ethyl ester hydrochloride was refluxed for 3 hours in 100 ml. of 3 N hydrochloric acid. The solution was evaporated in vacuo and the residue was treated with acetone yielding N-(3-methoxy-$\alpha$-methylbenzyl)-N-methylglycine hydrochloride which, after recrystallization from methanol-benzene, was found to have a melting point of 152–154°.

Example 14

9.5 g. of (N-3-methoxy-$\alpha$-methylbenzyl)-N-methylglycine hydrochloride was dissolved in 50 ml. of 70 percent (by weight) sulfuric acid and warmed on the steam bath for 4 hours. After cooling, an excess of 20 percent sodium hydroxide was added slowly. The mixture was extracted with ether. The ether extract was dried over potassium carbonate and the ether distilled off in vacuo yielding 2,3-dihydro-7-methoxy-1,2-dimethyl-4(1H) - isoquinolone as an oil. The base was dissolved in ether and the resultant ether solution neutralized with isopropanolic hydrochloric acid. 2,3-dihydro-7-methoxy-1,2-dimethyl-4(1H)-isoquinolone hydrochloride crystallized and was separated. The product was recrystallized from methanol-isopropanol and was found to have a melting point of 236–237°.

Example 15

A mixture of 15.5 g. of 3-methoxy-$\alpha$,N-dimethylbenzylamine, 17.0 g. of ethyl $\alpha$-bromopropionate, 16 g. of anhydrous sodium carbonate and 100 ml. of benzene was refluxed for two days. After cooling, the solution was filtered. The filtrate was concentrated in vacuo to a small volume, and the residue was treated with 150 ml. of ether. The solution was filtered and made acid by addition of isopropanolic hydrochloric acid. An oil separated which was extracted with water. The aqueous layer was cautiously made alkaline. N-(3-methoxy-$\alpha$-methylbenzyl)-N-methylalanine ethyl ester separated and was extracted with ether. The ether was distilled off and the residue was fractionated in vacuo, yielding the ester of B.P. 120–122°/0.3 mm. with $n_D^{26}$=1.5028.

Example 16

1.5 g. of N-(3-methoxy-$\alpha$-methylbenzyl)-N-methylalanine ethyl ester was added to 12 ml. of 80 percent (by weight) sulfuric acid. The solution was heated to 80–90° for 4 hours. After cooling, an excess of 6 N solution hydroxide was added cautiously. The cold alkaline solution was extracted three times with ether. The ether extracts were combined, dried, and the ether distilled off in vacuo yielding 1,2-dihydro-7-methoxy-1,2,3-trimethyl-4(3H)-isoquinolone as an oil. The oil was dissolved in ether and the resultant ether solution neutralized with isopropanolic hydrochloric acid. 1,2-dihydro - 7 - methoxy-1,2,3-trimethyl-4(3H)-isoquinolone hydrochloride crystallized. Upon recrystallization from alcohol-isopropanol it was found to have a melting point of 217–218°.

Example 17

20.4 g. of 3-methoxybenzaldehyde, 16 g. of benzylamine and 50 ml. of benzene were refluxed with a water-trap until 2.6 ml. of water had been collected. The benzene was distilled off in vacuo and the residue was dissolved in 100 ml. of ethanol. To this stirred solution, 5.5 g. of sodium borohydride was added slowly at 25–30°. After stirring for an additional two hours, the solvents were removed in vacuo. The residue was treated with 25 ml. of water and the mixture warmed slightly. The insoluble oil was extracted with ether and dried over potassium carbonate. The solution was acidified with isopropanolic hydrochloric acid. 3-methoxydibenzylamine hydrochloride was obtained which, upon recrystallization from ethyl acetate, was found to have a melting point 128–129°. The hydrochloride was treated with an excess of 6 N sodium hydroxide and the resultant solution was repeatedly extracted with ether. The ether extracts were dried and concentrated yielding the free base, 3-methoxydibenzylamine, as an oil.

Example 18

A mixture of 55.4 g. of 3-methoxydibenzylamine, 110 g. of sodium carbonate and 42 ml. of ethyl chloroacetate was refluxed for 12 hours with stirring. The salts were filtered and the filtrate was concentrated in vacuo to dryness. The residue was shaken with 500 ml. of ether, cooled and filtered. The ether filtrate was distilled and the residue was fractionated in vacuo to yield N-(3-methoxybenzyl)-N-benzylglycine ethyl ester as a colorless liquid of B.P. 153–156°/0.1 mm.

Example 19

50 g. of N-(3-methoxybenzyl)-N-benzylglycine ethyl ester was dissolved with external ice cooling in 400 ml. of 80 percent (by weight) sulfuric acid. The solution was kept on the steambath for 12 hours. It was then cooled and added slowly with stirring to 2000 ml. of ice cold 6 N sodium hydroxide. The alkaline solution was extracted three times with 200 ml. of chloroform. The combined chloroform extracts were dried over sodium sulfate and distilled in vacuo. The residue was recrystallized from benzene-petroleum ether, yielding 2-benzyl-1,2-dihydro-7-methoxy-4(3H)-isoquinolone of melting point 144–146°.

Example 20

60 g. of 3-methoxyacetophenone and 42.8 g. of benzylamine were refluxed with a water-trap until 7 ml. of water had collected. The benzene was distilled off and the residue was dissolved in 300 ml. of ethanol. 17.5 g. of sodium borohydride were added slowly at room temperature with stirring. After complete addition, stirring was continued for two hours. The solution was distilled to dryness in vacuo and the residue was treated with 200 ml. of water and warmed to about 50°. After cooling, the mixture was extracted twice with ether. The ether solution was dried over potassium carbonate and filtered. The filtrate was distilled in vacuo to remove ether, yielding N-(3-methoxy - $\alpha$ - methylbenzyl)-benzylamine as an oil. The oil was dissolved in ether and the resultant solution filtered. To the filtrate, isopropanolic hydrochloric acid was added in excess. Colorless crystals of N-(3-methoxy - $\alpha$ - methylbenzyl)-benzylamine hydrochloride formed which, upon filtration and recrystallization from methanol-acetone, was found to have a melting point of 173–174°. The hydrochloride was converted back to the free base as in Example 5.

Example 21

A mixture of 20 g. of N-(3-methoxy-$\alpha$-methylbenzyl)-benzylamine, 16 g. of ethyl bromoacetate, 20 g. of dry sodium carbonate and 120 ml. of benzene was refluxed overnight. After cooling, the mixture was filtered and the filtrate concentrated in vacuo. The residue was treated with 100 ml. of ether. After filtration of the ether solution, the clear filtrate was made acid with an excess of isopropanolic hydrochloric acid. An oil separated which was extracted with water. The resultant aqueous solution was made alkaline with ice cold 6 N sodium hydroxide and extracted with ether. After distillation of the ether extract, the remaining oil was fractionated in vacuo yielding N-benzyl-N-(3-methoxy-$\alpha$-methylbenzyl)glycine ethyl ester of B.P. 130–135°/0.05 mm. and $n_D^{26}$=1.5420.

Example 22

14 g. of N-(3-methoxy-α-methylbenzyl)-N-benzylglycine ethyl ester was dissolved in 98 ml. of 80 percent (by weight) sulfuric acid and warmed on the steambath for 4 hours. After cooling, an excess of sodium hydroxide was cautiously added with cooling. The alkaline mixture was repeatedly extracted with ether. To the dried and filtered combined ether extracts, an excess of isopropanolic hydrochloric acid was slowly added. An oil separated, which solidified on standing. It was recrystallized from ethanol yielding 2-benzyl-1,2-dihydro-7-methoxy-1-methyl-4(3H)-isoquinoline hydrochloride of melting point 196–197°.

Example 23

10 g. of 3-methoxybenzophenone and 8 g. of methylamine were dissolved in 70 ml. of alcohol. After addition of 0.1 ml. of acetic acid, the mixture was heated under 50 lbs. of hydrogen for 3 hours to 100–110° in a pressure bottle. The cooled solution was stirred, and 3 g. of sodium borohydride was added slowly at room temperature. After stirring for an additional hour, the solvents were removed in vacuo and the residue was warmed with 200 ml. of water to 50–60°. After cooling, the mixture was extracted repeatedly with ether. The dried ether extracts were neutralized with isopropanolic hydrochloric acid. 3-methoxy-N-methyl-α-phenylbenzylamine hydrochloride formed which, after filtration and recrystallization from a mixture of acetonitrile and methanol was found to have a melting point of 222–223°. The free base of the hydrochloride was prepared as in Example 5.

Example 24

A mixture of 8.5 g. of 3-methoxy-N-methyl-α-phenylbenzylamine, 8 g. of ethyl bromoacetate, 15 g. of sodium carbonate and 70 ml. of benzene was refluxed overnight on the steambath. After cooling, the undissolved salts were filtered off and the filtrate was distilled to dryness in vacuo. The residue was dissolved in 100 ml. of ether. After standing for an hour the solution was filtered. The filtrate was neutralized with isopropanolic hydrochloric acid, yielding N-(3-methoxy-α-phenylbenzyl)-N-methylglycine ethyl ester hydrochloride. The product was recrystallized from isopropanol and was found to have a melting point of 155–156°.

Example 25

5 g. of N-(3-methoxy-α-phenylbenzyl)-N-methylglycine ethyl ester hydrochloride was dissolved in 45 ml. of 80 percent (by weight) sulfuric acid and warmed for 5 hours on the steambath. The solution was added slowly with stirring to a cooled solution of 40 g. of sodium hydroxide in 150 ml. of water. The mixture was extracted with ether. The dried ether extract was neutralized with isopropanolic hydrochloric acid. 1,2-dihydro-7-methoxy-2-methyl-1-phenyl-4(3H)-isoquinolone hydrochloride crystallized. Upon recrystallization from methanol, it was found to have a melting point of 206–207°.

Example 26

30 g. of 3,4-dimethoxybenzaldehyde and 15 g. of methylamine in 150 ml. of ethanol were heated to 90–95° under 50 lbs. of hydrogen in a pressure bottle for 6 hours. The solution was cooled to room temperature and 7.5 g. of NaBH$_4$ was carefully added wih stirring. After stirring for an additional 3 hours, the solvents were removed in vacuo. The residue was treated with 50 ml. of water and the mixture warmed slightly. The insoluble oil was extracted with ether and dried over potassium carbonate. The ether solution was treated with isopropanolic hydrochloric acid yielding 3,4-dimethoxy-N-methylbenzylamine hydrochloride. Recrystallization from ethanol yielded the pure compound of melting point 202–204°. The free base of the hydrochloride was prepared as in Example 5.

Example 27

24 g. of 3,4-dimethoxy-N-methylbenzylamine, 25 ml. of ethyl chloroacetate, 50 g. of anhydrous sodium carbonate and 125 ml. of ethanol were refluxed overnight with stirring. After cooling to room temperature, the mixture was filtered. The clear filtrate was distilled in vacuo until the solvent was removed. The residue was extracted with ether. From the dried ether solution the ether was distilled off. The remaining oily residue was fractionated in vacuo, yielding N-(3,4-dimethoxybenzyl)-N-methylglycine ethyl ester of B.P. 125–135°/0.25 mm. Redistillation gave the ester as a colorless, water insoluble liquid of B.P. 135–136°/0.25 mm.

Example 28

A mixture of 26 g. of N-methyl-3,4-dimethoxybenzylamine, 37 g. of ethyl chloroacetate, 30 g. of anhydrous sodium carbonate and 125 ml. of benzene was refluxed overnight. After cooling to room temperature, the mixture was filtered and the filtrate was distilled to dryness in vacuo. The oily residue was dissolved in 200 ml. of ether. The solution was allowed to stand for about one hour and was then filtered. The filtrate was neutralized with isopropanolic hydrochloric acid. N-(3,4-dimethoxybenzyl)-N-methylglycine ethyl ester hydrochloride crystallized immediately. It was filtered off and washed with ether. Recrystallization from alcohol gave the hydrochloride of melting point 107–109°.

Example 29

2 g. of N-(3,4-dimethoxybenzyl)-N-methylglycine ethyl ester hydrochloride was dissolved in 17 ml. of 80 percent (by weight) sulfuric acid. The solution was heated for 4 hours on the steambath. After cooling, the mixture was cautiously made alkaline with 6 N sodium hydroxide solution. The so-formed 1,2-dihydro-6,7-dimethoxy-2-methyl-4(3H)-isoquinolone was extracted 3 times with ether. The dried ether solution was neutralized with isopropanolic hydrochloric acid. 1,2-dihydro-6,7-dimethoxy-2-methyl-4(3H)-isoquinolone hydrochloride separated and was filtered. Recrystallization from methanol gas the hydrochloride as colorless needles of melting point 252–253°.

Example 30

83 g. of 3,4-dimethoxybenzaldehyde, 53.5 g. of benzylamine and 200 ml. of benzene were refluxed with a water-trap until 9 ml. of water had been collected. The benzene solution was evaporated to dryness and the residue was dissolved in 200 ml. of ethanol. At room temperature, 25 g. of sodium borohydride were slowly added with stirring to the alcoholic solution of the Schiff's base. Stirring was continued for 6 hours after complete addition of the borohydride. The solvent was removed in vacuo and the residue was treated with 250 ml. of water and warmed on the steambath. After cooling, the mixture was extracted twice with ether. The dried ether solution was neutralized with isopropanolic hydrochloric acid. Colorless crystals formed immediately. They were filtered and washed with ether. Recrystallization from ethanol yielded 3,4-dimethoxy-dibenzylamine hydrochloride of melting point 184–186°. The free base was prepared from the hydrochloride as in Example 5.

Example 31

A mixture of 37.5 g. of 3,4-dimethoxy-dibenzylamine, 26 ml. of ethyl chloroacetate, 73 g. of anhydrous sodium carbonate and 150 ml. of ethanol was refluxed overnight with stirring. After cooling, the mixture was filtered off and the filtrate was distilled to dryness in vacuo. The residue was dissolved in ether. The dried and filtered ether solution was distilled on the waterbath. The residue was distilled in vacuo. N-(3,4-dimethoxybenzyl)-N-benzylglycine ethyl ester of B.P. 178–181°/1 mm. was obtained.

The base, N - (3,4 - dimethoxybenzyl) - N - benzylglycine ethyl ester was dissolved in ether. The resultant solution was neutralized with an excess of isopropanolic hydrochloric acid.

The oily hydrochloride was kept in a desiccator for several weeks until is solidified. Recrystallization of the crude hydrochloride from acetone-ether yielded the salt of melting point 140–141°.

Example 32

10 g. of N - (3,4 - dimethoxybenzyl) - N - benzylglycine ethyl ester hydrochloride was dissolved in 70 ml. of 80 percent (by weight) sulfuric acid. The solution was warmed on the steambath for 4 hours. After cooling, the mixture was made alkaline by cautious addition of 6 N sodium hydroxide solution. The liberated base, namely, 2 - benzyl - 1,2 - dihydro - 6,7 - dimethoxy - 4(3H)-isoquinolone, was extracted 3 times with ether. The dried ether solution was neutralized with isopropanolic hydrochloric acid. 2 - benzyl - 1,2 - dihydro - 6,7 - dimethoxy - 4(3H) - isoquinolone hydrochloride crystallized slowly and was filtered. Recrystallization from methanol gave the pure compound of melting point 216–217°.

We claim:
1. A compound of the formula

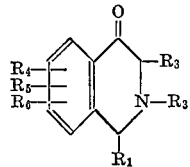

wherein $R_1$ is selected from the group consisting of hydrogen, lower alkyl, phenyl and halophenyl; $R_2$ is selected from the group consisting of hydrogen, lower alkyl, benzyl and substituted benzyl selected from the group consisting of benzyl, substituted on the phenyl moiety with lower alkyl and halo, and α-lower alkyl-substituted benzyl; $R_3$ is selected from the group consisting of hydrogen and lower alkyl; and $R_4$, $R_5$ and $R_6$ are each selected from the group consisting of hydrogen, lower alkyl and lower alkoxy; at least one of $R_1$, $R_3$, $R_4$, $R_5$ and $R_6$ being other than hydrogen.

2. A compound as defined in claim 1 wherein $R_1$ is phenyl; $R_2$ is lower alkyl; $R_3$, $R_4$ and $R_5$ are all hydrogen and $R_6$ is lower alkoxy and is joined to the isoquinoline nucleus in the 7-position thereof, i.e. 1,2-dihydro-7-lower alkoxy-2-lower alkyl-1-phenyl-4(3H)-isoquinolone.

3. A compound as defined in claim 1 wherein $R_1$, $R_2$ and $R_3$ are lower alkyl; $R_4$ and $R_5$ are hydrogen and $R_6$ is lower alkoxy and is joined to the isoquinoline nucleus at the 7-position thereof, i.e. 1,2-dihydro-7-lower alkoxy-1,2,3-trilower alkyl-4(3H)-isoquinolone.

4. A compound as defined in claim 1 wherein $R_1$ is lower alkyl; $R_3$, $R_4$ and $R_5$ are all hydrogen; $R_2$ is benzyl and $R_6$ is lower alkoxy and is joined to the isoquinoline nucleus a the 7-position thereof, i.e. 2-benzyl-1,2-dihydro-7-lower alkoxy-1-lower alkyl-4(3H)-isoquinolone.

5. A compound as defined in claim 1 wherein $R_1$, $R_3$ and $R_4$ are all hydrogen; $R_2$ is lower alkyl and $R_5$ and $R_6$ are both lower alkoxy and joined to the isoquinoline nucleus, respectively, at positions 6 and 7 thereof, i.e., 1,2-dihydro-6,7-dilower alkoxy-2-lower alkyl-4(3H)-isoquinolone.

6. A compound as defined in claim 1 wherein at least one of $R_4$, $R_5$ and $R_6$ is other than hydrogen and is lower alkyl.

7. A process which comprises treating a compound of the formula

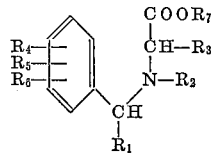

wherein $R_1$ is selected from the group consisting of hydrogen, lower alkyl, phenyl and halophenyl; $R_2$ is selected from the group consisting of hydrogen, lower alkyl, benzyl and substituted benzyl selected from the group consisting of benzyl, substituted on the phenyl moiety with lower alkyl and halo, and α-lower alkyl-substituted benzyl; $R_3$ is selected from the group consisting of hydrogen and lower alkyl; $R_4$, $R_5$ and $R_6$ are each selected from the group consisting of hydrogen, lower alkyl and lower alkoxy and $R_7$ is selected from the group consisting of hydrogen and lower alkyl with a dehydrating agent selected from the group consisting of hydrochloric acid, hydrobromic acid, sulfuric acid and phosphoric acid whereby to prepare a compound of the formula

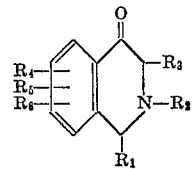

wherein $R_1$, $R_2$, $R_3$, $R_4$, $R_5$ and $R_6$ are as above.

References Cited

Hinton et al.: Jour. Chem. Soc. (London) 1959, pp. 599–610.

Clemo et al.: Jour. Chem. Soc. (London) vol. 127, pp. 2297–2307 (1925).

Kametani et al.: Jour. Chem. Soc. (London) 1963, pp. 4289–97.

ALEX MAZEL, Primary Examiner

D. G. DAUS, Assistant Examiner

U.S. Cl. X.R.

260—239.3, 286, 288, 471, 487, 543, 566, 999, 690, 689, 599, 577, 583